United States Patent
Andersson et al.

(10) Patent No.: US 6,434,812 B1
(45) Date of Patent: Aug. 20, 2002

(54) METHOD OF MANUFACTURING AND HANDLING PARTS FOR A PACKAGING CONTAINER

(75) Inventors: Jan Andersson, Ystad; Ulf Johnsson, Hoor; Lennart Gustafsson, deceased, late of Lund, all of (SE), by Martin Ahlgren, Jan Fredén, legal representatives

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 09/341,361

(22) PCT Filed: Dec. 2, 1997

(86) PCT No.: PCT/SE97/02017
§ 371 (c)(1),
(2), (4) Date: Feb. 3, 2000

(87) PCT Pub. No.: WO98/32586
PCT Pub. Date: Jul. 30, 1998

(30) Foreign Application Priority Data

Jan. 29, 1997 (SE) ................................................ 9700260

(51) Int. Cl.[7] .............................................. B23P 17/00
(52) U.S. Cl. ............................ 29/417; 29/412; 29/415; 264/527; 264/531; 264/540
(58) Field of Search ........................ 29/412, 415, 417; 264/138, 145, 148, 150, 151, 152, 159, 523, 527, 531, 540, 542, 543

(56) References Cited

U.S. PATENT DOCUMENTS

| | | | | |
|---|---|---|---|---|
| 1,210,842 A | * | 1/1917 | Rickman | 264/527 |
| 2,501,833 A | * | 3/1950 | Webb et al. | 264/561 |
| 2,790,994 A | * | 5/1957 | Cardot et al. | 264/525 |
| 3,310,620 A | * | 3/1967 | Martelli et al. | 264/526 |
| 3,350,740 A | * | 11/1967 | Fischer | 425/218 |
| 3,394,209 A | * | 7/1968 | Cheney | 264/527 |
| 3,428,722 A | * | 2/1969 | Chittenden et al. | 264/526 |
| 3,432,586 A | * | 3/1969 | Stenger | 264/527 |
| 3,456,290 A | * | 7/1969 | Ruekberg | 425/531 |
| 3,457,590 A | * | 7/1969 | Dittmann | 427/531 |
| 3,768,380 A | | 10/1973 | Stark | |
| 3,793,421 A | * | 2/1974 | Paubandt | 264/527 |
| 3,862,698 A | * | 1/1975 | Hafele | 428/542.8 |
| 3,939,236 A | * | 2/1976 | Hahn | 264/53 |
| 4,103,411 A | * | 8/1978 | Gottsegen | 29/416 |
| 4,502,607 A | * | 3/1985 | Szajna | 220/608 |
| 4,518,558 A | * | 5/1985 | Anway et al. | 264/515 |
| 4,796,766 A | * | 1/1989 | Clark | 215/370 |
| 4,938,680 A | * | 7/1990 | Guarriello et al. | 425/522 |
| 4,954,310 A | * | 9/1990 | Andersen | 264/520 |
| 4,961,701 A | * | 10/1990 | Barth | 425/527 |
| 4,988,399 A | * | 1/1991 | Watson et al. | 156/73.5 |
| 5,045,255 A | * | 9/1991 | Kurz | 264/51 |
| 5,155,980 A | | 10/1992 | Mansson et al. | |
| 5,202,078 A | * | 4/1993 | Moore | 264/527 |
| 5,227,114 A | * | 7/1993 | Moore | 264/527 |
| 5,427,258 A | * | 6/1995 | Krishnakumar et al. | 215/400 |
| 6,047,756 A | * | 4/2000 | Uchida | 156/393 |

* cited by examiner

*Primary Examiner*—David P. Bryant
*Assistant Examiner*—Essama Omgba
(74) *Attorney, Agent, or Firm*—Burns, Doane, Swecker & Mathis, L.L.P.

(57) ABSTRACT

A method of manufacturing and handling parts for a packaging container comprises the steps of producing a number of tops in the form of pairwise reversed tops, separating the pairs one from another and providing them with closure arrangements. The tops may be manufactured by blow molding an extruded hose of thermoplastic material.

7 Claims, 1 Drawing Sheet

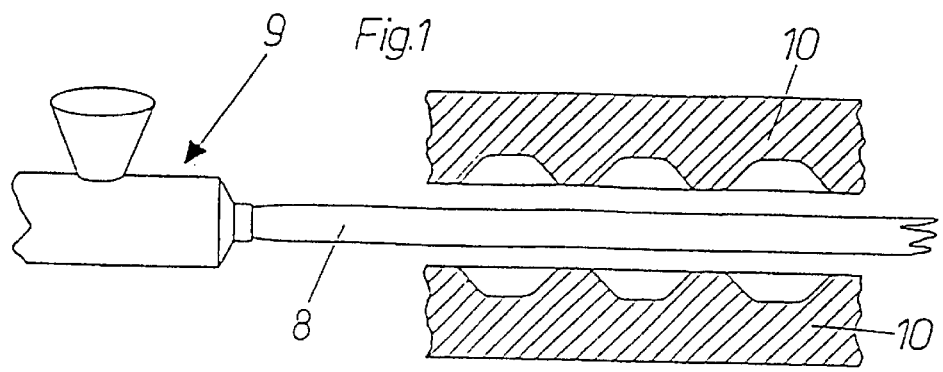
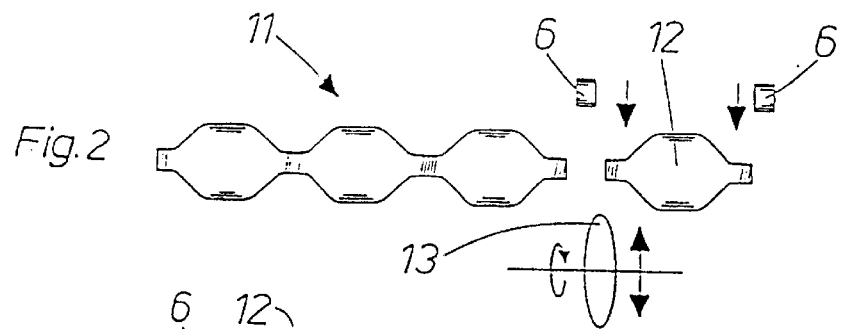
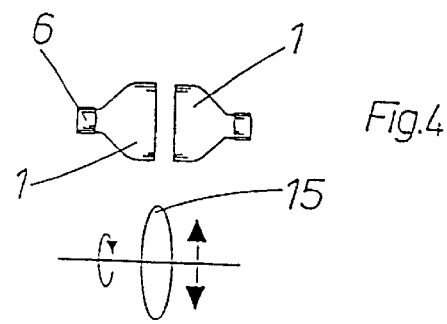
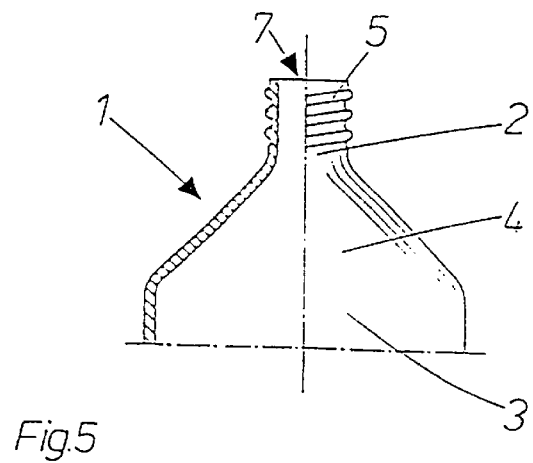
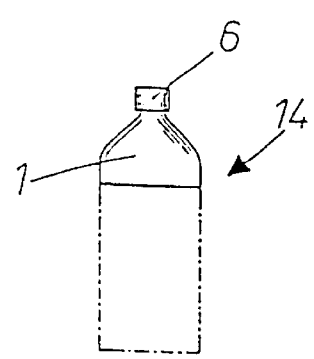

METHOD OF MANUFACTURING AND HANDLING PARTS FOR A PACKAGING CONTAINER

TECHNICAL FIELD

The present invention relates to a method of manufacturing and handling parts for a packaging container.

BACKGROUND ART

Beverage packages for drinks of different types, for example fruit juices, sports drinks or other non-carbonated drinks occur on the market in a plurality of different forms. Plastic packages, for example blow moulded bottles or deep drawn beakers or cans are common on the market. Packages of laminated paper/plastic laminate as well as deep drawn aluminium cans are also common. A cost-effective packaging container presupposes low production costs, high production output rates (mass production) and an expedient choice of materials. The material type(s) of the package should be selected such that the properties of the material are adapted not only to the beverage which is to be packed, but also to the package type and its use. The properties of the material as regards, for example, mechanical durability, liquid-tightness and gas barrier properties should, in other words, be selected such that the material combination as a whole is not over-qualified in relation to its purpose, which, for example, might probably be considered the case when a deep drawn aluminium can is employed for non-carbonated products, since its mechanical durability is greatly over dimensioned and the desired barrier properties can be obtained with but an extremely thin layer of aluminium, or other barrier material. Deep drawn plastic bottles are also normally over dimensioned from the point of view of mechanical strength in the packing of so-called still drinks, and it may generally be ascertained that it is usual that precisely still drinks are often packed in far too exclusive and expensive packaging containers.

An optimum packaging container which is particularly intended for still drinks and which is also sterilisable and thereby suitable for aseptic packing of drinks is made up of several parts, e.g. a casing, a top portion, a bottom portion, and a closure arrangement, each one of these being adapted to its given purpose in view of material selection and method of production. By utilising a separate top portion, this may, for example, be made from stronger or mechanically more stable material so that application and handling of the closure arrangement can take place without the risk of damage to the packaging container itself. The handling of the individual packaging component parts may, however, entail certain difficulties, in particular in the manufacture of aseptic packaging containers. Apart from the obvious risk that the parts during handling (transport, assembly, sealing, etc.) are exposed to contaminants or bacteria, there is also an obvious risk of mechanical damage, for example chipping or scratching. In particular in aseptic packages, a bacteria-tight package is of decisive importance for the capability to retain the pristine quality of the packed product, and even very slight damage to, for example, the sealing or tightening surfaces of the packaging component parts may consequently be of major negative importance. This applies not least to the sealing and thread surfaces of the neck portion which are particularly vulnerable and sensitive.

It is known in the art to manufacture packaging containers or parts therefor, for example top or bottom portions, from different types of plastic materials which are formed by various, per se known techniques for the forming of thermoplastic. The top portion often includes closure arrangements or threads for screw caps, which increases the demands on the method of manufacture and the plastic quality employed for this particular part. For example, it is known to manufacture tops for packaging containers by injection moulding, which gives a high degree of accuracy and quality but impedes or renders impossible the production of tops with an integrated gas barrier layer, which, for example, is desirable in the packing of fruit juices. Another prior art forming technique is conventional thermoforming of a web-shaped heated material which in itself may include an integrated barrier layer. However, this method gives varying material thickness and a poorer level of part and detail accuracy, which has a negative effect on the possibility of forming with sufficient precision a neck portion with threading or other mechanical engagement regions for a closure arrangement.

A further, per se known technique for producing packaging containers is blow moulding, in which the starting material is preferably a freshly extruded plastic hose which in itself may include an integrated barrier layer of some suitable, per se known barrier plastic. With the aid of mould halves surrounding the plastic hose, and suitable pressure difference, the plastic hose may be given the desired packaging configuration. As mentioned above, the packaging container may, in such instance, include a barrier layer and the method also makes it possible to manufacture the packaging container with a high degree of accuracy also as regards such items as threaded neck regions, but the method suffers from a decisive drawback in the fact that it is comparatively slow, both in the extrusion of the requisite hose length for realising a packaging container, and also the cooling of the packaging container formed from the hose, as the packaging container must remain in the mould halves until such time as its temperature has fallen so that the material has become geometrically stable. The large and unevenly distributed plastic volume not only delays cooling but also entails an uneven cooling effect and, since positive cooling in practice is not feasible, this method must be deemed far too slow for the modern, high capacity production of packaging containers.

There is thus a need in the packaging industry and technology to realise a method which makes it possible, with high precision and great rapidity, to rationally manufacture parts for packaging containers while ensuring a minimum risk of handling damage, as well as a high standard of hygiene.

SUMMARY OF THE INVENTION object of the present invention is thus to realise a method of manufacturing and handling parts for a packaging container, the method obviating the above-outlined drawbacks and making for rapid and rational manufacture, at the same time as handling is facilitated and contributes in reducing to a minimum the risk of mechanical damage which may jeopardise the gas and bacteria tightness of the finished packaging containers.

A further object of the present invention is to realise a method of manufacturing and handling parts for packaging containers which makes for rational manufacture and handling of packaging container tops, while maintaining a high standard of hygiene.

Yet a further object of the present invention is to realise a method of manufacturing and handling packaging container tops which makes it possible to protect the inner surface of the tops and reduces the need for cleaning and sterilisation.

Still a further object of the present invention is to realise a method of manufacturing and handling parts for a packaging container, the method being rapid and economical in terms of resources and, as a result, not suffering from the drawbacks inherent in prior art manufacturing methods, e.g. slowness, insufficient forming precision or high costs.

These and other objects have been attained according to the present invention in that a method of manufacturing and handling parts for packaging containers has been given the characterizing feature that a number of tops are produced in the form of a continuous row of pairwise reversed tops, each pair thereafter being separated from neighbouring pairs and provided with closure arrangements in the end portions exposed as a result of this separation.

Preferred embodiments of the method according to the present invention have further been given the characterizing features as set forth in appended subclaims 2 to 8.

BRIEF DESCRIPTION OF THE ACCOMPANYING DRAWING

On preferred embodiment of the manufacturing method according to the present invention will now be described in greater detail hereinbelow, with particular reference to the accompanying drawings which show only those details indispensable to an understanding of the present invention. In the accompanying drawings:

FIG. 1 shows a method according to the present invention of extruding a hose and reforming it into top portions;

FIG. 2 shows top portions formed in accordance with the method of FIG. 1 during the division into individual top pairs;

FIG. 3 shows a top pair after the application of closure arrangements;

FIG. 4 shows the division of the top pair into individual tops;

FIG. 5 shows, on a larger scale and partly in section, a packaging container top manufactured using the method according to the present invention; and FIG. 6 schematically illustrates a finished packaging container with a top portion manufactured using the method according to the present invention.

DESCRIPTION OF PREFERRED EMBODIMENT

According to one preferred embodiment of the method of manufacturing and handling parts for packaging containers, packaging container tops 1 of the type illustrated in FIG. 5 are manufactured. Each top comprises an upper end with a neck 2 and a lower end with a substantially cylindrical edge zone 3. The neck 2 and the edge zone 3 are interconnected with a progressively flared or conical portion 4. The packaging container top 1 is manufactured from a thermoplastic material, e.g. polyethylene, which may also include layers of other thermoplastic materials, for example barrier plastics or the like. The neck 2 displays an outer thread 5, but it is also possible to provide the neck 2 with other means for form-locked engagement with a closure arrangement 6 which, in the described embodiment, consists of a per se conventional screw cap. At the upper end of the neck 2, there is provided a sealing edge 7 for sealing abutment against the inside of the closure arrangement 6.

FIGS. 1–4 show the successive manufacture and handling of the packaging container tops 1 applying the method according to the present invention. More precisely, FIG. 1 shows how a hose 8 of heated thermoplastic material is extruded with the aid of a per se known extruder 9. The extruded hose 8 (which may consist of co-extruded material and, for instance, also include layers of a suitable barrier plastic, such as EVOH) is led in between mould halves 10 which, in the closed state, together form a configuration which defines the configuration of a number of successively arranged packaging container tops 1. After extrusion of a suitable hose length, the mould halves 10 are closed around a portion of the hose 8, whereafter the hose, in a per se known manner with the aid of, for example compressed air, is expanded into abutment against the mould surfaces of the mould halves 10 so that a continuous row 11 (FIG. 2) of packaging container tops 1 is created. After the opening of the mould halves 10 and severing of the row 11 from the hose 8, the row—for example consisting of eight packaging container tops 1—is transferred to a subsequent apparatus for separating neighbouring top pairs 12 from one another. As is particularly apparent from FIG. 2, the row 11 consists of a number of packaging container tops 1, every second one of which being reversed, so that the row consists of tops which are united with one another alternatingly via the necks 2 and alternatingly via the cylindrical edge zones 3. With the aid of a rotary cutter device 13 of known type, one top pair 12 is separated from the row 11, whereafter the separated pair 12 is immediately provided with closure arrangements 6 such that the interior of the reversed and united tops 1 forming the top pair 12 is screened off and discrete from the ambient atmosphere. Hereby, dirt or bacteria are prevented from penetrating and reaching the inner surface of the packaging container tops 1 which will subsequently come into contact with the contents of the container. Since the separation of the individual top pairs 12 and application of the closure arrangements 6 take place immediately after the extrusion and the forming of the hose 8, the interior of the top pairs will be substantially free of bacteria and contaminants, and as a result of the immediate application of the closure arrangements 6, this state is maintained until such time as the individual packaging container tops 1 are connected to the remaining parts of the packaging container, as will be described in greater detail below. Given that the packaging container tops 1 included in the top pairs 12 are already at this stage provided with closure arrangements 6, the sealing edges 7 of the tops 1 will be protected from mechanical action in the continued handling of the tops. The opposing part of the packaging container tops 1, i.e. the cylindrical edge zones 3, will also be protected from mechanical action since they are united with one another, which ensures that a good connection and seal to remaining parts of the packaging container body are facilitated.

The top pairs 12 being thus protected against both mechanical action and contamination, they can, in the form illustrated in FIG. 3, simply be handled and packed in, for instance, open crates or the like without any additional protective measures needing to be implemented. As a result, it will also be possible to dispense with a subsequent, normally undertaken cleaning of the inside of the packaging container tops prior to completion of the entire packaging container and its filling with the desired contents. The separation of the packaging container tops 1 included in each top pair 12 (as illustrated in FIG. 4) should, for these reasons, take place as late as possible and ideally in immediate conjunction with mounting of the packaging container tops 1 in connection with the completion of the entire packaging containers 14 (FIG. 6). The division of the packaging container tops 1 may take place with the aid of a per se known rotary cutter device 15, whereafter the individual tops 1 are immediately taken care of and connected in a suitable manner, for example by thermosealing, to a packaging container body of per se known, optional type, for example a sleeve wound from a plastic/paper laminate. The packaging container is then finished and may be transported further to be filled with the desired contents, possibly after having been provided with an external decorative artwork layer.

It should be observed that, while the described embodiment of the present invention relates to a packaging container with a casing portion or sleeve which is of circular cross-sectional configuration, there is nothing to prevent the employment of other cross-sectional configurations, for example octagonal or irregular (including non-cylindrical). Naturally, the other parts of the packaging container must be adapted appropriately to the configuration of the pertinent casing portion.

By manufacturing and handling a plurality of preferably blow moulded tops simultaneously in accordance with the method according to the present invention, rapid and rational manufacture is made possible, which had hitherto not proved feasible in the blow moulding of entire packaging containers. Since the method of manufacture also creates the possibility of handling the tops in the form of pairwise closed units, the necessary hygienic handling of them is also facilitated at the same time as mechanical damage (which increases the risk of untightness and leakage in the finished packaging containers) is prevented.

The present invention should not be considered as restricted to that described above and shown on the Drawing, many modifications being conceivable without departing from the scope of the appended Claims.

What is claimed is:

1. A method of manufacturing and handling parts for packaging containers, comprising the steps of:
    producing a number of tops in the form of a continuous row of pairwise reversed tops by blow molding an extruded hose;
    separating each pair from adjacent pairs thereby forming exposed end portions of the separated pair; and
    providing said exposed end portions of the separated pair with closure arrangements;
    wherein the tops provided with the closure arrangements are separated from one another and each is connected to a packaging container body.

2. The method as claimed in claim 1, wherein the tops are produced by thermoforming of hose-shaped plastic material.

3. The method as claimed in claim 2, wherein the hose-shaped material, in a heated and plastic state, is subjected to a pressure difference which urges the material into abutment against outer mould halves.

4. The method as claimed in claim 1, wherein the hose is extruded with an integrated gas barrier layer.

5. The method as claimed in claim 1, wherein the end portions of the tops are designed for form-locked engagement with its respective closure arrangement.

6. The method as claimed in claim 1, wherein the interior of the pairwise reversed and continuous tops is screened off and discrete from the ambient atmosphere by each of said closure arrangements tightly closing its respective top.

7. The method as claimed in claim 1, wherein said blow molding step is performed by blowing air into the hose.

* * * * *